United States Patent
Gonthier

(10) Patent No.: US 9,525,361 B2
(45) Date of Patent: Dec. 20, 2016

(54) CONTROLLED RECTIFYING CIRCUIT

(71) Applicant: STMicroelectronics (Tours) SAS, Tours (FR)

(72) Inventor: Laurent Gonthier, Tours (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 4 days.

(21) Appl. No.: 14/826,627

(22) Filed: Aug. 14, 2015

(65) Prior Publication Data

US 2016/0111969 A1    Apr. 21, 2016

(30) Foreign Application Priority Data

Oct. 17, 2014    (FR) ...................................... 14 59993

(51) Int. Cl.
*H02M 7/00*    (2006.01)
*H02M 7/06*    (2006.01)
*H02M 7/162*    (2006.01)
*H02M 1/08*    (2006.01)
*H02M 7/155*    (2006.01)

(52) U.S. Cl.
CPC ............... *H02M 7/06* (2013.01); *H02M 1/081* (2013.01); *H02M 7/155* (2013.01); *H02M 7/1623* (2013.01)

(58) Field of Classification Search
CPC .... H02M 1/083; H02M 7/162; H02M 7/1216; H02M 1/4225; Y02B 70/126; Y10S 323/908
USPC ... 363/37, 51–54, 84, 85, 89, 125, 126, 127; 323/222, 243, 266, 908
See application file for complete search history.

(56) References Cited

U.S. PATENT DOCUMENTS

| 4,376,968 A * | 3/1983 | Wueschinski | H02M 7/1623 323/243 |
| 4,811,189 A * | 3/1989 | Harvest | H02M 7/1623 363/128 |
| 5,822,203 A * | 10/1998 | Peron | H02M 1/083 323/908 |
| 6,222,749 B1 * | 4/2001 | Peron | H02M 1/083 363/125 |
| 6,493,245 B1 | 12/2002 | Phadke | |

(Continued)

FOREIGN PATENT DOCUMENTS

FR    2038643 A5    1/1971
FR    2742013 A1    6/1997

(Continued)

OTHER PUBLICATIONS

EP Search Report and Written Opinion for co-pending EP Appl. No. 15182375.4 dated Feb. 24, 2016 (8 pages).

(Continued)

*Primary Examiner* — Rajnikant Patel
(74) *Attorney, Agent, or Firm* — Gardere Wynne Sewell, LLP

(57) ABSTRACT

A rectifying circuit includes a first diode coupled between a first terminal configured to receive application of an A.C. voltage and a first terminal configured to deliver a rectified voltage; and an anode-gate thyristor coupled between a second terminal configured to receive application of the A.C. voltage and a second terminal configured to deliver the rectified voltage, wherein an anode of the anode-gate thyristor is connected to the second terminal configured to deliver the rectified voltage.

26 Claims, 2 Drawing Sheets

(56) References Cited

U.S. PATENT DOCUMENTS 6,714,429 B2 *  3/2004  Phadke ................ H02H 9/001
                                                    323/222

FOREIGN PATENT DOCUMENTS

FR      2746981  A1   10/1997
FR      2816127  A1    5/2002

OTHER PUBLICATIONS

INPI Search Report and Written Opinion for FR 1459993 dated Jun. 4, 2015 (7 pages).

* cited by examiner

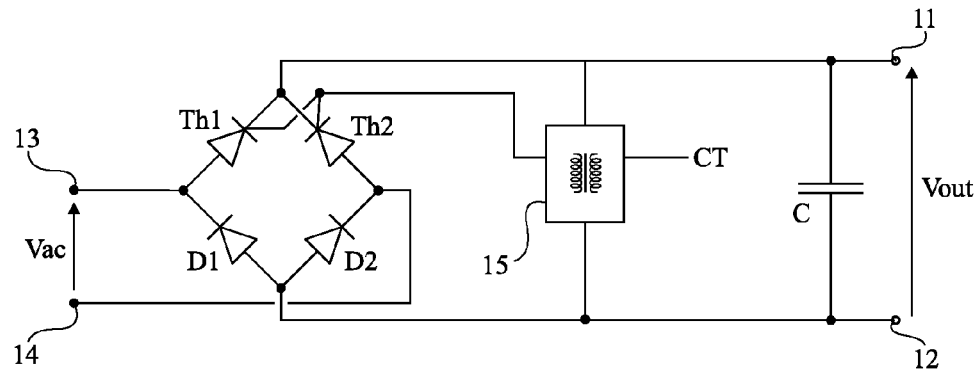

CONTROLLED RECTIFYING CIRCUIT

PRIORITY CLAIM

This application claims the priority benefit of French Patent application number 1459993, filed on Oct. 17, 2014, the contents of which is hereby incorporated by reference in its entirety to the maximum extent allowable by law.

TECHNICAL FIELD

The present disclosure generally relates to electronic circuits and, more specifically, to the implementation of a rectifying bridge based on diodes and on thyristors.

BACKGROUND

Many solutions of controllable rectifying bridges, based on the use of thyristors, are known.

For example, U.S. Pat. No. 6,493,245 (incorporated by reference) describes a rectifying bridge having two cathode-gate thyristors provided in the upper portion of the bridge, that is, with the cathodes connected to the positive potential of the rectified voltage.

SUMMARY

An embodiment overcomes all or part of the disadvantages of usual rectifying bridges with thyristors.

Another embodiment provides a controllable rectifying bridge, which can be controlled in simplified fashion.

Another embodiment provides a rectifying bridge directly controllable by a microcontroller.

Thus, an embodiment provides a rectifying circuit comprising: between a first terminal of application of an A.C. voltage and a first terminal of delivery rectified voltage, a first diode; and between a second terminal of application of the A.C. voltage and a second terminal of delivery of the rectified voltage, a first anode-gate thyristor, the anode of the first thyristor being connected to the second rectified voltage delivery terminal.

According to an embodiment, the circuit further comprises, between the second terminal of application of the A.C. voltage and the first terminal of delivery of the rectified voltage, a second diode.

According to an embodiment, the circuit further comprises, between the first terminal of application of the A.C. voltage and the second terminal of delivery of the rectified voltage, a second anode-gate thyristor, the anode of the second thyristor being connected to the second rectified voltage delivery terminal.

According to an embodiment, the circuit further comprises, between the cathode of the first thyristor and each terminal of application of the A.C. voltage, a diode.

According to an embodiment, the circuit further comprises at least one stage for controlling the thyristor or one of the thyristors, comprising: a diode connecting the thyristor gate to the second terminal of delivery of the rectified voltage; and a capacitive element in series with a resistive element connecting the thyristor gate to a control pulse generation circuit.

According to an embodiment, each thyristor is associated with a control stage.

According to an embodiment, the control circuit generates pulse trains at a frequency in the order of from 10 to 100 times greater than the frequency of the A.C. voltage.

According to an embodiment, the control circuit is powered with a voltage delivered by a power supply circuit connected to the first rectified voltage delivery terminal, a capacitor connecting the power supply circuit to the second rectified voltage delivery terminal.

According to an embodiment, a switch controlled by the control circuit is interposed between the second rectified voltage delivery terminal and a node of interconnection of the anode of the thyristor or of the anodes of the thyristors, of the cathode of the diode of the control stage or of the cathodes of the diodes of the control stages, of a reference terminal of the control circuit, and of the capacitor.

According to an embodiment, the circuit further comprises a capacitive element between the two terminals of delivery of the rectified voltage.

According to an embodiment, a switch controlled by the control circuit is interposed between the second rectified voltage delivery terminal and a node of interconnection of two capacitors forming said capacitive element, a diode connecting said node to a terminal for supplying the control circuit.

According to an embodiment, at least one diode in series with a resistive element connects the second rectified voltage delivery terminal to one of the terminals of application of the A.C. voltage.

BRIEF DESCRIPTION OF THE DRAWINGS

The foregoing and other features and advantages will be discussed in detail in the following non-limiting description of specific embodiments in connection with the accompanying drawings.

FIG. 1 is an electric diagram of an example of a usual rectifying bridge with thyristors;

FIG. 2 is an electric diagram of an embodiment of a rectifying bridge with thyristors;

FIG. 3 is an electric diagram of an alternative embodiment of a controllable rectifying bridge.

DETAILED DESCRIPTION

Figure 4:
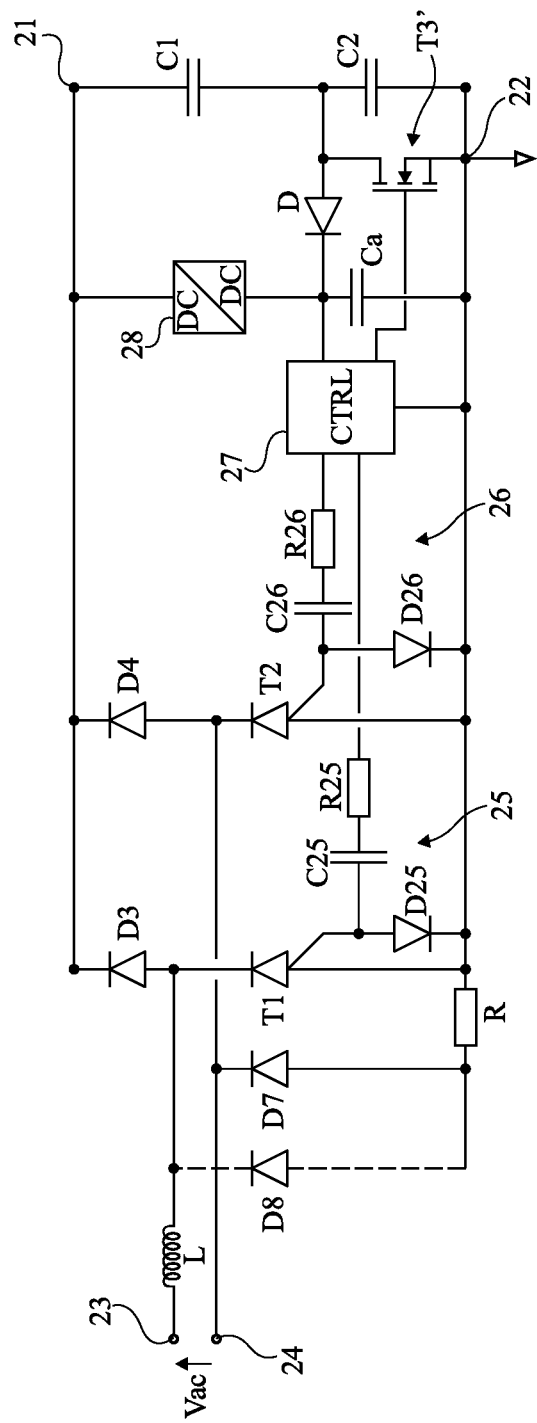
FIG. 4 is an electric diagram of another embodiment of a rectifying bridge with thyristors.

The same elements have been designated with the same reference numerals in the different drawings. For clarity, only those steps and elements which are useful to the understanding of the described embodiments have been shown and will be detailed. In particular, what use is made of the rectified voltage has not been detailed, the described embodiments being compatible with usual applications of such a rectified voltage. Further, the circuits for generating control signals from a microcontroller have not been detailed either, the described embodiments being here again compatible with usual control signal generation circuits.

FIG. 1 is an electric diagram of an example of a controllable rectifying bridge with thyristors of the type described in above-mentioned U.S. Pat. No. 6,493,245. This bridge is a fullwave bridge and comprises two parallel branches between two terminals 11 and 12 of delivery of a rectified voltage Vout. Each branch comprises a thyristor Th1, respectively Th2, connected to a diode D1, respectively D2, the diode anodes being on the side of terminal 12 which defines the most negative potential (generally the ground or reference potential) of rectified voltage Vout. The respective junction points of the thyristors and the diodes define two terminals 13 and 14 of application of an A.C. voltage Vac to be rectified. A capacitive element C is generally connected between terminals 11 and 12 to smooth the rectified voltage. Possibly, an inductive element (not shown) may be interposed at the bridge input (for example, between terminal 13 and the junction point of thyristor Th1 and diode D1). Such an element is particularly used to filter the current drawn from the bridge input. An inductive element may also be placed at the output, between, for example, terminal 11 and the common point of the two anodes of thyristors Th1 and Th2. This inductive element may be placed upstream or downstream of capacitor C. This type of element may be used, for example, in a switched-mode power supply circuit used to correct the power factor of the current drawn from the network.

Thyristors Th1 and Th2 are cathode-gate thyristors intended to be controlled from a signal CT.

In such a controllable rectifying bridge, a control voltage directly originating from a microcontroller cannot be applied, neither can, more generally, a voltage directly referenced to reference potential 12, due to the reference of the cathodes of thyristors Th1 and Th2, which is on the side of the most positive potential (terminal 11) of the rectified voltage. This imposes using a conversion element 15 of galvanic isolation transformer or optocoupler type to convert the reference of the control signal.

Such an embodiment increases the production costs of a controllable rectifying bridge.

FIG. 2 is an electric diagram of an embodiment of a controllable rectifying circuit. This circuit comprises a rectifying bridge having two parallel branches between two terminals 21 and 22 of delivery of a rectified voltage Vout. Each branch comprises a diode D3, respectively D4, connected to a thyristor T1, respectively T2, between terminals 21 and 22, the thyristor anodes being connected to terminal 22 and the diode cathodes being connected to terminal 21. The respective midpoints of the two branches define terminals 23 and 24 of application of an A.C. voltage Vac to be rectified, terminal 23 being connected to the anode of diode D3 and to the cathode of thyristor T1, terminal 24 being connected to the anode of diode D4 and to the cathode of thyristor T2. A filtering capacitive element C preferably connects terminals 21 and 22.

Thyristors T1 and T2 are anode-gate thyristors. The respective gates of thyristors T1 and T2 receive control signals from a circuit 27 of digital control circuit or microcontroller (CTRL) type, via stages 25 and 26. Each stage is formed of a diode D25, respectively D26, connecting the gate of thyristor T1, respectively T2, to terminal 22, the anode of diode D25 or D26 being on the gate side of thyristor T1 or T2, and of a series association of a capacitive element C25, respectively C26, and of a resistive element R25, respectively R26, connecting the respective gates of thyristors T1 and T2 to circuit 27.

Control circuit 27 is for example a microcontroller or an integrated circuit powered from a low voltage (for example, of a value in the range from 3.3 volts to 12 volts) generated by a power supply circuit 28 (DC/DC) from voltage Vout. A capacitive element Ca is connected between circuit 28 and terminal 22. Such a circuit, of voltage regulator type, delivers a power supply voltage adapted to circuit 27. The microcontroller may on the other hand receive data from other circuits, not shown.

A difference with respect to the circuit of FIG. 1 is that it is no longer necessary to use a conversion element of optocoupler or galvanic insulation transformer type to apply the control signals to the thyristors. This considerably simplifies the forming of a controllable rectifying bridge and decreases the cost thereof.

The bridge operates as follows. Thyristor T2 is turned on during positive halfwaves of the input voltage and thyristor Ti is turned on during negative halfwaves.

For current to flow through one of thyristors T1 and T2, the anode potential thereof should be greater than its cathode potential and be activated by drawing a current on its gate. For simplification, in the following explanations, forward voltage drops will be neglected in the diodes and the thyristors.

According to an embodiment, to turn on one of the thyristors, circuit 27 generates a pulse train at a frequency greater than the frequency of voltage Vac (for example, approximately from 10 to 100 times greater).

During a positive halfwave, for each (positive) pulse generated by circuit 27, a current flows through resistor R26, through capacitance C26, and through diode D26, which causes the charge of capacitance C26. When the output signal of circuit 27 is lowered to a low level (generally, the level of reference terminal 22), an inverse current flows by the discharge of capacitance C26 through resistor R26, circuit 27 (in practice, the low transistor of its output stage, not shown), and the gate of thyristor T2. As soon as the cathode potential of thyristor T2 becomes lower than its anode potential, that is, the rectified amplitude of voltage Vac becomes greater than the voltage across capacitance C, thyristor T2 turns on at the falling edge of the next control pulse generated by circuit 27. This amounts to drawing a current into this gate and turns on transistor T2, which remains on until its current becomes zero.

It should be noted that the higher the frequency of the pulses generated by circuit 27, the shorter the delay between the time when the anode-cathode voltage of thyristor T2 becomes positive and the turning-on of thyristor T2.

A similar operation takes place during negative halfwaves with thyristor T1 and stage 25.

According to an alternative embodiment which requires for circuit 27 to monitor respective voltage levels Vac and Vout, a single control pulse is generated per halfwave of voltage Vac when the other conduction conditions are complied with.

At the circuit starting, that is, when capacitor C is initially discharged, circuit 27 is not powered if it is not connected to another power source.

To allow the starting, an inductive element may then be provided between one of terminals 23 and 24 and the input of the bridge having this terminal connected thereto. The effect of this inductance is to slow down the growth of the current drawn from terminals 23 and 24 when thyristors T1 and T2 are turned on while capacitor C is not or is only very lightly charged.

According to a variation which will be discussed hereafter in relation with FIG. 3, an initial charge (at the starting) of capacitor 27 is ensured by one or a plurality of additional diodes as well as a resistive element, between one of terminals 23 and 24 and terminal 22 of the bridge.

FIG. 3 shows the electric diagram of an alternative embodiment.

As compared with the embodiment of FIG. 2, a single anode-gate thyristor T is used. The cathode of this thyristor T is connected to respective anodes of diodes D5 and D6, respectively connected in the same bridge arms as diodes D3 and D4, the junction points of diodes D3 and D5, respectively D4 and D6, being connected to terminals 23 and 24. Such an embodiment adds a voltage drop in the rectifying bridge but enables to use a single anode-gate thyristor to control the two halfwaves. Control stage 29 of thyristor T is formed of a diode D29, of a capacitor C29, and of a resistor R29 in the same way as stages 25 and 26 of FIG. 2.

FIG. 3 illustrates another variation aiming at enabling to initially charge capacitor C. To achieve this, a diode D7 connects one of the input terminals (for example, terminal 24) to ground 22 via a resistor R. Another diode D8 may connect the other input terminal (for example, 23) to resistor R to start in fullwave mode. The effect of this resistance (which generally has a temperature variation coefficient) is to enable capacitor C to charge on powering-on, while circuit 27 is not powered yet and thus cannot control thyristors T1 and T2, which are thus in the off state (otherwise preventing any charge of C). Such a variation enables to power circuit 27 while avoiding an inductive element at the bridge input.

This variation enabling to initially charge capacitor C may be combined with the embodiment of FIG. 2.

According to another variation shown in FIG. 3, a switch T3 (for example, a MOS transistor) is interposed between terminal 22 and a node, noted 22a, representing the common connection of the anode of thyristor T, of the cathode of diode D29, of the reference terminal of circuit 27, and of capacitor Ca. Switch T3 is controlled by circuit 27 and is off at the starting. It enables for the charge current, powering circuit 28 through resistor R, not to charge capacitor C, but only capacitor Ca, when the controlled rectifying bridge (formed of elements D3, D4, D5, D6, and T, or of elements D3, D4, T1, and T2) is deactivated. This embodiment enables to decrease losses consumed in standby mode by the complete circuit and the circuits connected between terminals 21 and 22. In this embodiment, an inductive element may be useful to progressively charge capacitor C at the starting when switch T3 is turned on, by turning on thyristors T1 and T2 at the end of a halfwave of the mains voltage (voltage Vac) and by progressively increasing the conduction time of thyristors T1 and T2 until capacitor C is fully charged to a value close to the peak value of the A.C. voltage. This variation may here again be combined with the embodiment of FIG. 2.

FIG. 4 shows still another embodiment according to which, as compared with the embodiment of FIG. 2, capacitive element C is formed of two capacitors C1 and C2 having their junction point connected, by a diode D (anode of the diode connected to the junction point of capacitors C1 and C2), to the power supply terminal of circuit 27, that is, to the positive electrode of capacitor Ca. A switch T3' connects the anode of diode D to terminal 22. The embodiment of FIG. 4 also illustrates the presence of diodes D7 and D8 and of resistor R, as well as of an inductance L between terminal 23 and the anode of diode D3 (cathode of thyristor T1). At the starting, switch T3' is off and capacitors C1, C2, and Ca are charged through resistor R and diodes D7 and D8. The values of capacitors C2 and Ca are lower than the value of capacitor C1. Accordingly, the voltage thereacross increases more rapidly than the voltage across capacitor C1. As soon as the voltage across capacitor Ca is sufficient, control circuit 27 starts operating and turns on switch T3'. Thus, in steady state, the charge current of capacitor C1 is deviated from capacitor C2 which is not sized to withstand strong currents. This variation also applies to the case of FIG. 3 with a single thyristor T.

Various embodiments have been described. Various alterations, modifications, and improvements will occur to those skilled in the art. In particular, although the embodiments have been described in relation with an example of a fullwave rectifying bridge, a halfwave bridge may be provided by using a single one of diodes D3 and D4 and a single one of thyristors T1 and T2 (diode D3 and thyristor T2 or diode D4 and thyristor T1). A multiphase network with as many thyristor-diode arms as there are phases (for example, three thyristors and three diodes for a three-phase network) may also be provided. Further, the generation of the control signals capable of controlling the rectifying bridge depends on the application and is within the abilities of those skilled in the art according to this application. Further, the practical implementation of the embodiments which have been described is within the abilities of those skilled in the art based on the functional indications which have been described hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A rectifying circuit, comprising:
   a first diode coupled between a first terminal configured to receive application of an A.C. voltage and a first terminal configured to deliver a rectified voltage;
   a first anode-gate thyristor coupled between a second terminal configured to receive application of the A.C. voltage and a second terminal configured to deliver the rectified voltage, wherein an anode of the first anode-gate thyristor is connected to the second terminal configured to deliver the rectified voltage; and
   at least one stage for controlling the anode-gate thyristor, comprising:
      a second diode coupling a gate of the anode-gate thyristor to the second terminal configured to deliver the rectified voltage; and
      a capacitive element coupled in series with a resistive element to connect the gate of the anode-gate thyristor to a control pulse generation circuit.

2. The circuit of claim 1, further comprising a third diode coupled between the second terminal configured to receive application of the A.C. voltage and the first terminal configured to deliver the rectified voltage.

3. The circuit of claim 2, further comprising a second anode-gate thyristor coupled between the first terminal configured to receive application of the A.C. voltage and the second terminal configured to deliver the rectified voltage, wherein an anode of the second anode-gate thyristor is connected to the second terminal configured to deliver the rectified voltage.

4. The circuit of claim 2, further comprising a diode coupled between a cathode of the first anode-gate thyristor and each of the first and second terminals configured to receive application of the A.C. voltage.

5. The circuit of claim 3, further comprising a control stage comprising:
   a fourth diode coupling a gate of the second anode-gate thyristor to the second terminal configured to deliver the rectified voltage; and
   a capacitive element coupled in series with a resistive element to connect the gate of the second anode-gate thyristor to the control pulse generation circuit.

6. The circuit of claim 1, wherein the control pulse generation circuit is configured to generate pulse trains at a frequency in the order of from 10 to 100 times greater than a frequency of the A.C. voltage.

7. The circuit of claim 6, wherein the control pulse generation circuit is powered with a voltage delivered by a power supply circuit connected to the first terminal configured to deliver the rectified voltage, a capacitor connecting the power supply circuit to the second terminal configured to deliver the rectified voltage.

8. The circuit of claim 7, further comprising a switch controlled by the control pulse generation circuit and interposed between the second terminal configured to deliver the rectified voltage and a node of interconnection of the anode of the anode-gate thyristor.

9. The circuit of claim 7, further comprising a switch controlled by the control pulse generation circuit and interposed between the second terminal configured to deliver the rectified voltage and a node of interconnection of the cathode of the diode of the control stage.

10. The circuit of claim 7, further comprising a switch controlled by the control pulse generation circuit and interposed between the second terminal configured to deliver the rectified voltage and a node of interconnection of a reference terminal of the control pulse generation circuit.

11. The circuit of claim 7, further comprising a switch controlled by the control pulse generation circuit and interposed between the second terminal configured to deliver the rectified voltage and a node of interconnection of a capacitor.

12. The circuit of claim 1, further comprising a capacitive element coupled between the first and second terminals configured to deliver the rectified voltage.

13. The circuit of claim 12, further comprising a switch controlled by the control pulse generation circuit and interposed between the second terminal configured to deliver the rectified voltage and a node of interconnection of two capacitors forming said capacitive element, and a diode connecting said node of interconnection to a terminal for supplying the control pulse generation circuit.

14. The circuit of claim 1, further comprising at least one diode coupled in series with a resistive element to connects the second terminal configured to deliver the rectified voltage to one of the first and second terminals configured to receive application of the A.C. voltage.

15. A circuit, comprising:
first and second terminals configured to receive application of an A.C. voltage;
first and second terminals configured to deliver a rectified voltage;
a first diode coupled between the first terminal configured to receive application of the A.C. voltage and the first terminal configured to deliver the rectified voltage;
a second diode coupled between the second terminal configured to receive application of the A.C. voltage and the first terminal configured to deliver the rectified voltage;
a first anode-gate thyristor coupled between the first terminal configured to receive application of the A.C. voltage and the second terminal configured to deliver the rectified voltage;
a second anode-gate thyristor coupled between the second terminal configured to receive application of the A.C. voltage and the second terminal configured to deliver the rectified voltage;
a power supply circuit coupled between the first and second terminals configured to deliver the rectified voltage;
a control pulse generation circuit receiving power from the power supply circuit and having a first output coupled to a control gate of the first anode-gate thyristor and having a second output coupled to a control gate of the second anode-gate thyristor.

16. The circuit of claim 15, further comprising a third diode coupled in series with a resistor between the first terminal configured to receive application of the A.C. voltage and the second terminal configured to deliver the rectified voltage.

17. The circuit of claim 15, further comprising:
a first control stage circuit comprising:
a first capacitor and first resistor coupled in series between the first output of the control pulse generation circuit and the control gate of the first anode-gate thyristor; and
a third diode coupled between the control gate of the first anode-gate thyristor and the second terminal configured to deliver the rectified voltage; and
a second control stage circuit comprising:
a second capacitor and second resistor coupled in series between the second output of the control pulse generation circuit and the control gate of the second anode-gate thyristor; and
a fourth diode coupled between the control gate of the second anode-gate thyristor and the second terminal configured to deliver the rectified voltage.

18. The circuit of claim 15, further comprising:
a capacitor coupled between the first and second terminals configured to deliver the rectified voltage;
a transistor having a source-drain path coupled between the first and second anode-gate thyristors and the second terminal configured to deliver the rectified voltage, wherein a gate terminal of the transistor is coupled to a third output of said control pulse generation circuit.

19. The circuit of claim 15, further comprising:
a first capacitor coupled between the first terminal configured to deliver the rectified voltage and an intermediate node;
a second capacitor coupled between the intermediate node and the second terminal configured to deliver the rectified voltage;
a transistor having a source-drain path coupled between the intermediate node and the second terminal configured to deliver the rectified voltage, wherein a gate terminal of the transistor is coupled to a third output of said control pulse generation circuit.

20. The circuit of claim 19, further comprising a third diode coupled between the intermediate node and an output of the power supply circuit.

21. A circuit, comprising:
first and second terminals configured to receive application of an A.C. voltage;
first and second terminals configured to deliver a rectified voltage;
a first diode coupled between the first terminal configured to receive application of the A.C. voltage and the first terminal configured to deliver the rectified voltage;
a second diode coupled between the second terminal configured to receive application of the A.C. voltage and the first terminal configured to deliver the rectified voltage;
a third diode coupled between the first terminal configured to receive application of the A.C. voltage and an intermediate node;
a fourth diode coupled between the second terminal configured to receive application of the A.C. voltage and the intermediate node;
an anode-gate thyristor coupled between the intermediate node and the second terminal configured to deliver the rectified voltage;

a power supply circuit coupled between the first and second terminals configured to deliver the rectified voltage;

a control pulse generation circuit receiving power from the power supply circuit and having a first output coupled to a control gate of the anode-gate thyristor.

22. The circuit of claim 21, further comprising:

a capacitor coupled between the first and second terminals configured to deliver the rectified voltage;

a transistor having a source-drain path coupled between the anode-gate thyristor and the second terminal configured to deliver the rectified voltage, wherein a gate terminal of the transistor is coupled to a second output of said control pulse generation circuit.

23. The circuit of claim 22, further comprising:

a first capacitor coupled between the first terminal configured to deliver the rectified voltage and an intermediate node;

a second capacitor coupled between the intermediate node and the second terminal configured to deliver the rectified voltage;

a transistor having a source-drain path coupled between the intermediate node and the second terminal configured to deliver the rectified voltage, wherein a gate terminal of the transistor is coupled to a second output of said control pulse generation circuit.

24. The circuit of claim 23, further comprising a fifth diode coupled between the intermediate node and an output of the power supply circuit.

25. The circuit of claim 21, further comprising a fifth diode coupled in series with a resistor between the first terminal configured to receive application of the A.C. voltage and the second terminal configured to deliver the rectified voltage.

26. The circuit of claim 21, further comprising a control stage circuit comprising:

a first capacitor and first resistor coupled in series between the first output of the control pulse generation circuit and the control gate of the anode-gate thyristor; and a fifth diode coupled between the control gate of the anode-gate thyristor and the second terminal configured to deliver the rectified voltage.

* * * * *

UNITED STATES PATENT AND TRADEMARK OFFICE
CERTIFICATE OF CORRECTION

PATENT NO. : 9,525,361 B2
APPLICATION NO. : 14/826627
DATED : December 20, 2016
INVENTOR(S) : Laurent Gonthier It is certified that error appears in the above-identified patent and that said Letters Patent is hereby corrected as shown below:

In the Specification

At Column 4, Line number 3, please replace [Ti] with -- T1 --.

Signed and Sealed this
Twenty-eighth Day of February, 2017

Michelle K. Lee
*Director of the United States Patent and Trademark Office*